US010257825B2

(12) United States Patent
Gan et al.

(10) Patent No.: US 10,257,825 B2
(45) Date of Patent: Apr. 9, 2019

(54) REDUCING HARDWARE PRECISION TIME MEASUREMENT INACCURACY

(71) Applicant: Intel Corporation, Santa Clara, CA (US)

(72) Inventors: Say Cheong Gan, Bukit Mertajam (MY); Poh Thiam Teoh, Penang (MY); Hooi Kar Loo, Penang (MY); Sun Zheng E, Penang (MY); Keng Dar Ang, Penang (MY)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 15/282,411

(22) Filed: Sep. 30, 2016

(65) Prior Publication Data
US 2018/0098320 A1 Apr. 5, 2018

(51) Int. Cl.
H04W 72/04 (2009.01)
H04L 12/26 (2006.01)
H04L 5/00 (2006.01)
H04J 3/06 (2006.01)

(52) U.S. Cl.
CPC ....... H04W 72/0446 (2013.01); H04J 3/0664 (2013.01); H04L 5/0055 (2013.01); H04L 43/106 (2013.01)

(58) Field of Classification Search
CPC ... H04L 43/106; H04L 1/1678; H04L 1/1858; H04L 1/188; H04L 2001/0094; H04L 7/0016; H04W 72/0446; H04W 56/001
See application file for complete search history.

(56) References Cited

U.S. PATENT DOCUMENTS

| 2004/0100964 A1* | 5/2004 | Robotham ............ H04L 1/1809 370/394 |
| 2006/0126638 A1* | 6/2006 | Fuhs ........................ H04L 12/56 370/395.7 |
| 2012/0110225 A1* | 5/2012 | Wessling ................. G04G 5/00 710/61 |
| 2012/0311168 A1 | 12/2012 | Dougan et al. |
| 2014/0126394 A1* | 5/2014 | Stephens ........... H04W 56/0065 370/252 |
| 2014/0334582 A1* | 11/2014 | Bock ........................ G06F 1/12 375/356 |
| 2015/0278040 A1 | 10/2015 | Sikkink et al. |
| 2015/0317273 A1* | 11/2015 | Errickson ........... H04L 67/1095 709/248 |
| 2015/0370683 A1* | 12/2015 | Nishiyama .......... G06F 13/4282 714/43 |
| 2016/0013876 A1 | 1/2016 | Zhang et al. |

(Continued)

OTHER PUBLICATIONS

Intel, HP; "Precision Time Measurement (PTM), Revision 1.0a", PCI-SIG Engineering Change Notice; Mar. 31, 2013; 21 pages.

(Continued)

Primary Examiner — Ahmed Elallam
(74) Attorney, Agent, or Firm — Alliance IP, LLC

(57) ABSTRACT

Aspects of the embodiments are directed to systems, methods, and devices, such as an upstream device that includes an input/output port. The input/output port configured to receive a message from an output port of a downstream device; transmit a plurality of acknowledgement messages to the downstream device; and transmit a response message to the received message to the downstream device.

20 Claims, 12 Drawing Sheets

(56) References Cited

U.S. PATENT DOCUMENTS

2016/0188524 A1* 6/2016 Froelich .............. G06F 13/4059
710/106
2017/0288818 A1* 10/2017 Bock ....................... H04L 1/188

OTHER PUBLICATIONS

International Search Report and Written Opinion in International Application No. PCT/US2017/052126, dated Mar. 28, 2018, 9 pages.

* cited by examiner

REDUCING HARDWARE PRECISION TIME MEASUREMENT INACCURACY

FIELD

This disclosure pertains to computing system, and in particular (but not exclusively) to reducing hardware precision time measurement inaccuracies via programmable multiple acknowledgements.

BACKGROUND

Precision Time Measurement (PTM) enables precise coordination of events across multiple components with independent local time clocks. Such precise coordination would be difficult given that individual time clocks have differing notions of the value and rate of change of time. PTM allows components to calculate the relationship between their local times and a shared PTM Master Time: an independent time domain associated with a PTM Root.

DETAILED DESCRIPTION

Figure 1:
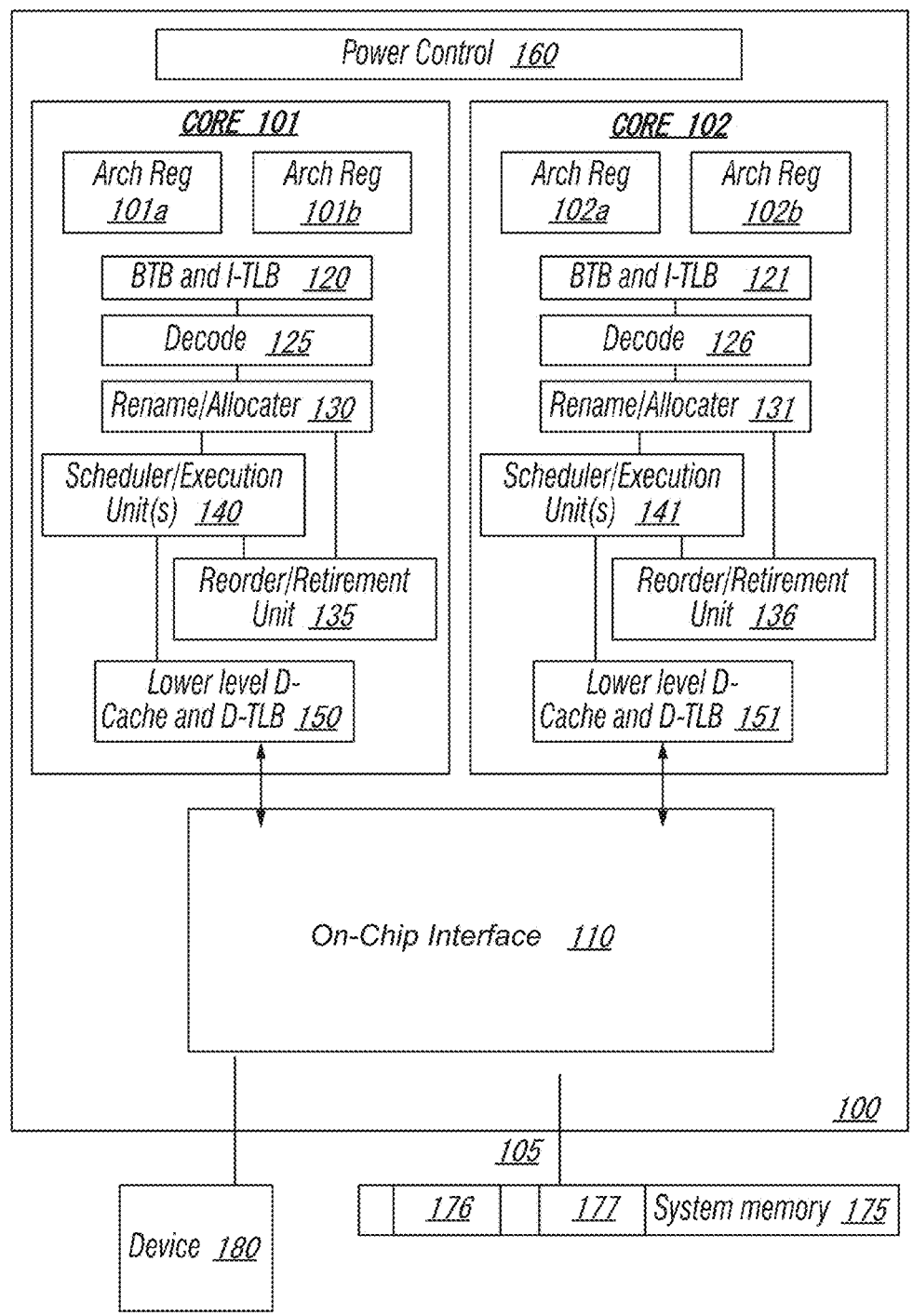
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Precision Time Measurement (PTM) is defined in the PCI Express (PCIe) Base Specification v3.0. Engineering Change Notice (ECN) is a protocol for precise coordination of events across multiple devices with independent local time. A PTM dialog is defined as a pair of messages containing a PTM request and a corresponding PTM Response or PTM Response with Data (ResponseD) message, as shown in FIG. 2.

Figure 2:
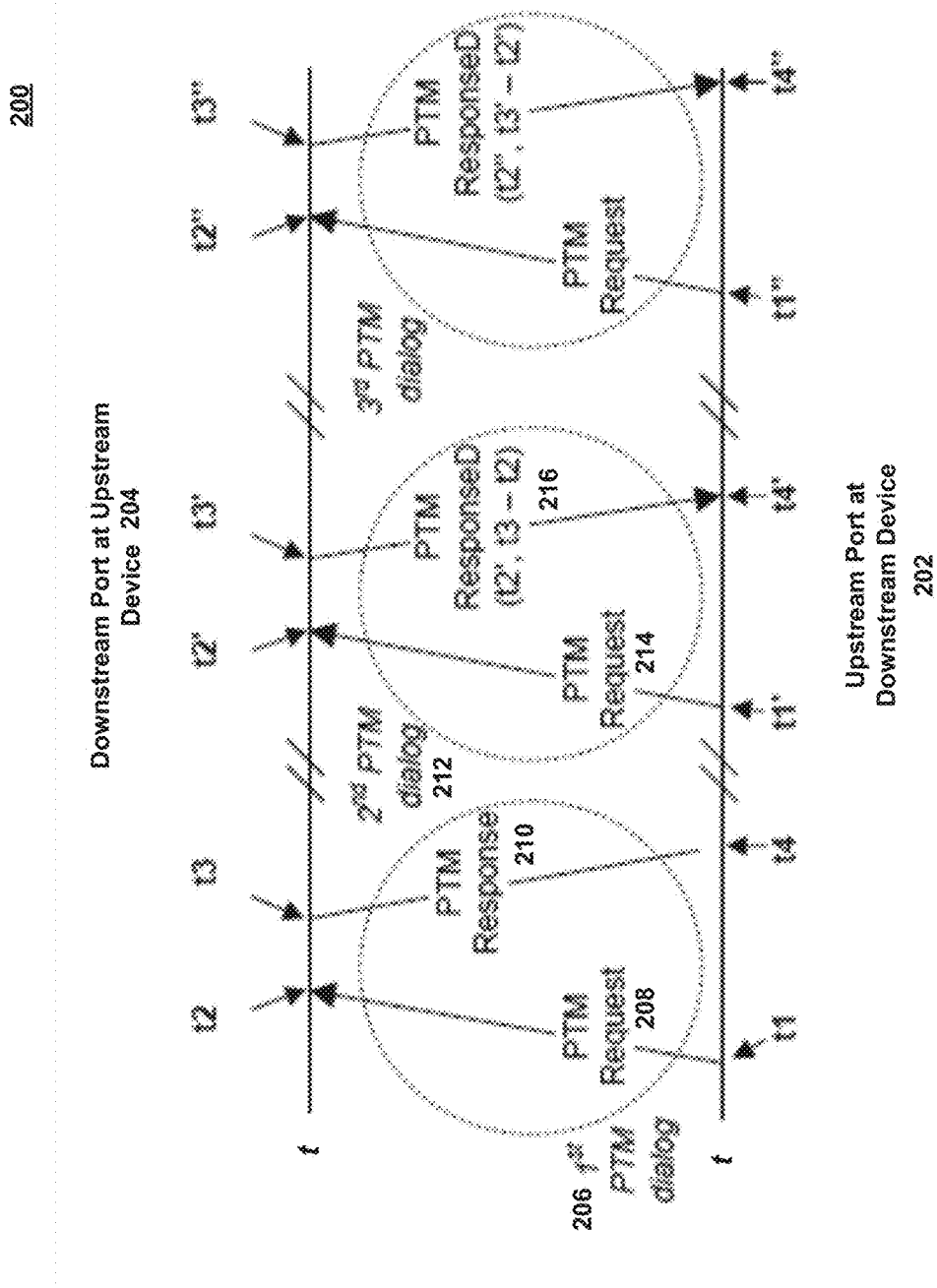
FIG. 2 is a schematic diagram of a set of PTM dialogs between a downstream device and an upstream device

FIG. 2 is a schematic diagram 200 of a set of PTM dialogs between a downstream device and an upstream device. The downstream device has an upstream port 202 through which the downstream device can send messages to an upstream device. The upstream device has a downstream port 204 through which the upstream device can send messages to a downstream device. The upstream device can be embodied as a PCIe root port. The PTM dialog enables components with differing local time to calculate the relationship between their local times and a shared PTM Master Time (a.k.a. TimeStampCounter, TSC) associated with a PTM Root. The PTM Root is a PCIe Root Port that is the source of PTM Master Time for all the devices, such as downstream device and upstream device in the PCIe hierarchy associated with that Root port. Points t1, t2, t3, and t4 in FIG. 2 represent the time stamps captured locally by each port (upstream port 202 and downstream port 204), as each port transmits and receives PTM messages. The time stamps from the previous PTM dialog are stored for use in the subsequent PTM dialogs.

As an example, as part of a first PTM dialog 206, a downstream device can transmit at time t1, through upstream port 202, a PTM request 208 to an upstream device. The upstream device can receive the PTM request 208 at t2. At t3, the upstream device can transmit, through downstream port 204, a PTM response to the downstream device, which is received by the downstream device at t4.

As part of a first PTM dialog 206, a downstream device can transmit at time t1, through upstream port 202, a PTM request 208 to an upstream device. The upstream device can receive the PTM request 208 at t2. At t3, the upstream device can transmit, through downstream port 204, a PTM response to the downstream device, which is received by the downstream device at t4.

Figure 3:
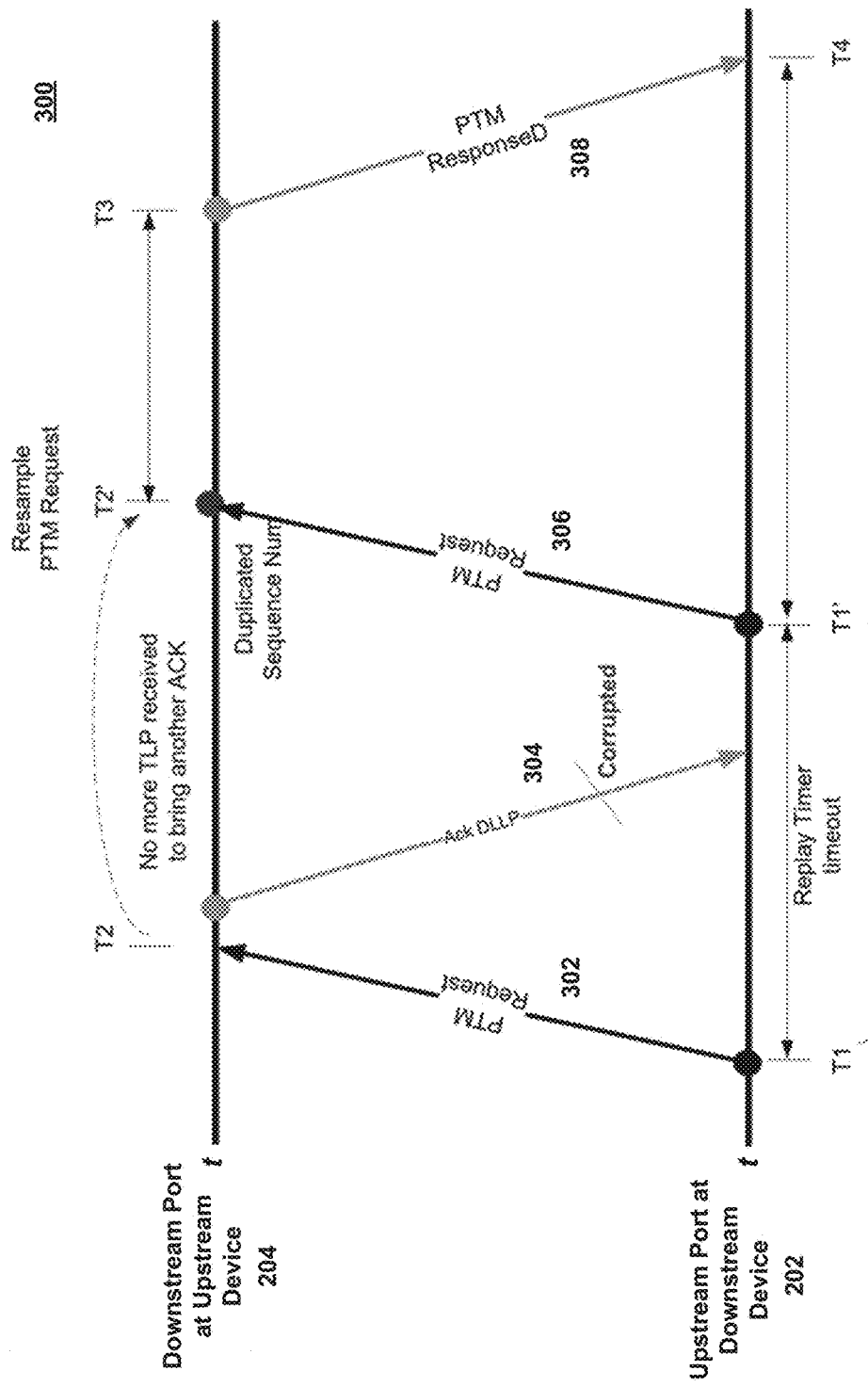
FIG. 3 is a schematic diagram illustrating a PTM dialog and with a corrupted acknowledgement packet.

FIG. 3 is a schematic diagram 300 illustrating a PTM dialog and with a corrupted acknowledgement packet. Under good condition operation, the PTM time stamps will be captured correctly by the PCIe root port and the devices, and the time stamps will be accurate (e.g., as shown in FIG. 2). In some conditions, however, the PCIe link can be lossy. In response to a PTM request 302, the upstream device downstream port 204 can transmit an acknowledgement data link layer packet (ACK DLLP) 304 transmitted from the PCIe Root Port can become corrupted when transmitted on the link. This corruption would prompt the downstream port 204 to retransmit the PTM Request message 306 after the replay timer times out. In response to the second PTM request message 306, the downstream device upstream port 204 can transmit the PTM ResponseD 308.

As an example, as shown in FIG. 3, at time t1, the upstream port 202 transmits the PTM request message 302 to the upstream device. The upstream port 204 transmits an ACK DLLP 304 to the downstream device, which becomes corrupted in this example (i.e., the ACK is not received at the downstream device). At time t1', the downstream device retransmits the PTM Request message 306. At time t2', the upstream device receives the PTM request message. Between time t2 and t2', no further transaction layer packets are received to prompt another ACK DLLP response from the upstream device. The retransmission of the PTM request message 306 would create a new time stamp t2', which suggests a new PTM dialog. However, at a time t3, the upstream device transmits the PTM Response message (PTM ResponseD 308) in response to the original PTM Request 302. The upstream device processes the original PTM Request 302 received at t2, even though a second PTM Request 306 was transmitted later in time. The PTM ResponseD 308 would provide a timestamp (t2). However, since the downstream device transmitted another PTM Request 306 at t1', the downstream device will capture t1' instead of t1 from the original PTM Request 302. Therefore, the upstream device and the downstream device become out of synch.

Figure 4:
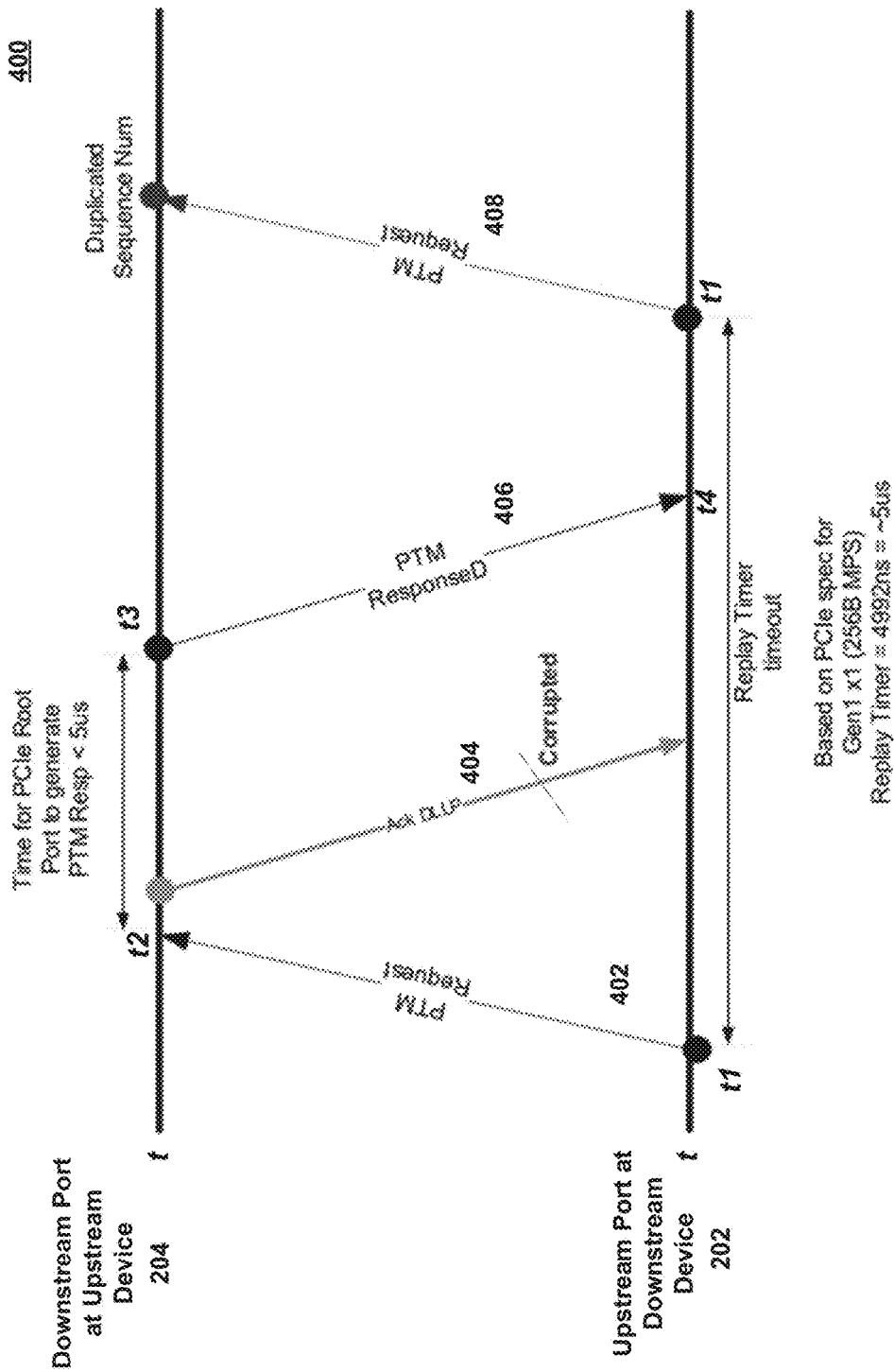
FIG. 4 is a schematic diagram illustrating a timer inaccuracy due to a racing condition between corrupted ACK DLLP and a PTM Response Message.

FIG. 4 is a schematic diagram 400 illustrating a timer inaccuracy due to a racing condition between corrupted ACK DLLP and a PTM Response Message. Per PCIe PTM ECN, both downstream device and PCIe root port are to re-sample the timer when the PTM messages are received. However the PCIe PTM ECN does not address a scenario whereby the PCIe root port would have to schedule a PTM Response message on the transmit data path before the downstream device re-transmits the PTM Request message due to a corrupted ACK DLLP. As a result of this racing condition, the timer calculations will be inaccurate.

FIG. 4 illustrates the racing condition described above. To reduce the likelihood of PTM timer inaccuracy, this disclosure describes a multiple ACK DLLP transmission by the PCIe root port whenever receiving a PTM Request message. The idea is to reduce the likelihood of the ACK DLLP to the PTM request message not being received by the PCIe device due to an ACK DLLP corruption on the link. If the PCIe device that sends the PTM Request message can consistently receive the ACK DLLP in return, there is no need to resend the PTM Request message. Hence, the PTM timer will be more accurate and precise.

The downstream device can transmit a PTM Request message 402 through an upstream port 202 to an upstream device. The responsive ACK DLLP message 404 can be transmitted to the downstream device from the upstream device's downstream port 204. The ACK DLLP message 404 can be corrupted, however, and not properly received by the downstream device. Within a time allotment set by the PCIe root port response timer, the upstream device can transmit a PTM response 406 to the request 402 to the downstream device because it received a PTM request message 402 and does not realize that the ACK DLLP 404 was corrupted or otherwise improperly received. The downstream device, however, having not received an ACK 404 will retransmit the PTM request 408. The PTM request message 408 retransmit will share the same sequence numbering as the originally transmitted PTM request message 402. But the PTM Request message 408 will include a timestamp for resending the PTM request (t1 because of the retransmission) and the timestamp for the received PTM ResponseD 406 (t4), where t1 is larger than t4, and the timestamp for the next dialog will include a negative history (t4–t1), where t1>t4.

Figure 5:
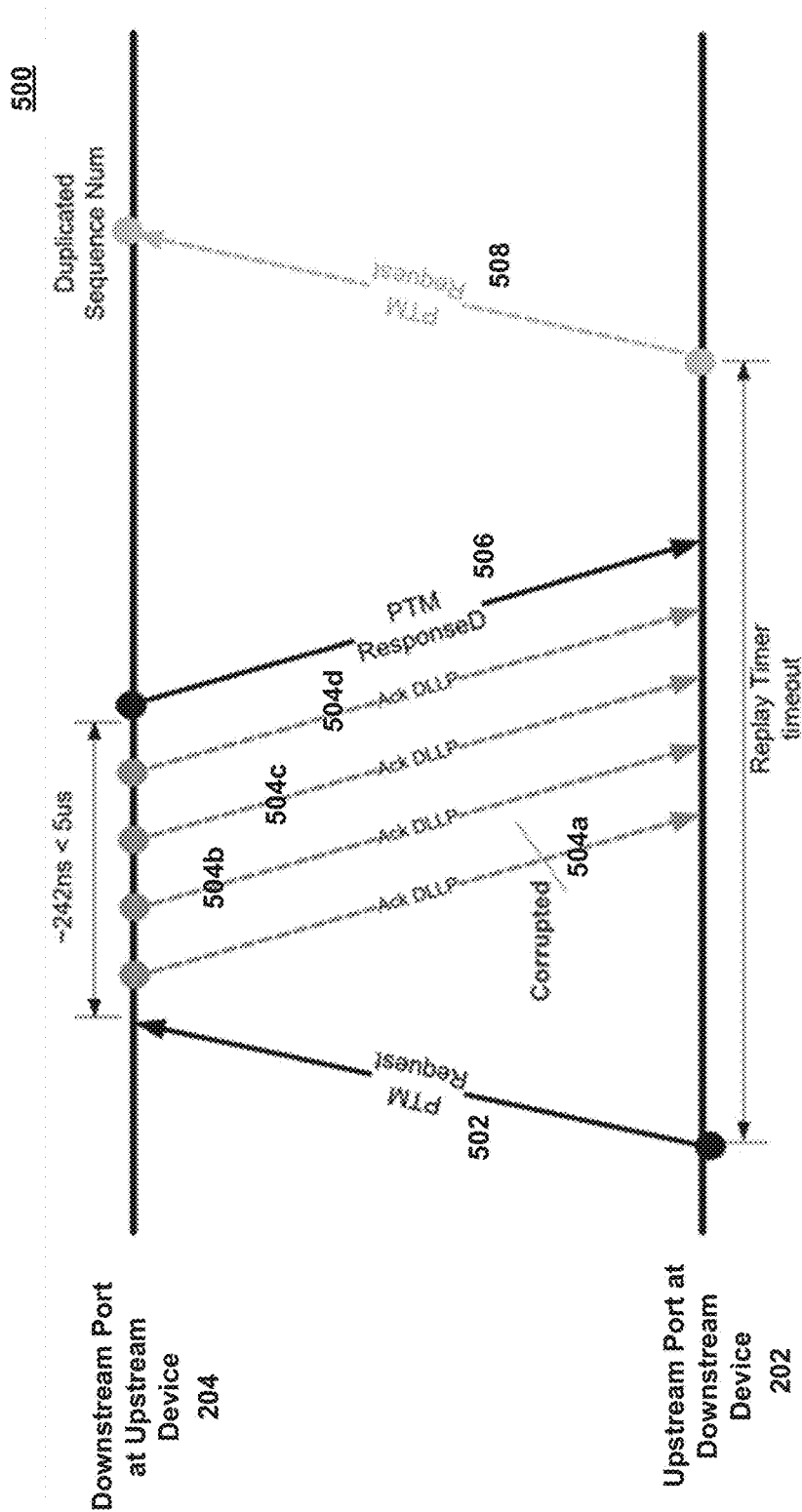
FIG. 5 is a schematic diagram of an example PTM dialog with multiple ACK transmission in accordance with embodiments of the present disclosure.

This disclosure describes a root port that is configured to define a programmable multiple ACK transmission mechanism to reduce the likelihood of an ACK corruption creating errors with timestamps or with erroneous duplicate PTM message transmittals (retransmittals). FIG. 5 is a schematic diagram 500 of an example PTM dialog with multiple ACK transmission in accordance with embodiments of the present disclosure. Whenever a PTM Request 502 is received, the PCIe root port will transmit through a downstream port 204 multiple duplicated ACKs 504a-504d to prevent the case where a corrupted ACK DLLP 504a will cause timestamp and/or duplication errors by reducing the likelihood of a corrupted ACK on the PCIe link. The number of duplicated ACKs to be transmitted is programmable through a configuration register. Within the time limit defined by the response timer, the PTM Response message (PTM ResponseD 506) can be transmitted through the downstream port 204 to the downstream device.

Despite one (or more) of the plurality of ACK DLLPs 504a-504d being corrupted (here, the corrupted ACK DLLP 504a), at least one of the ACK DLLPs 504b-504d can be successfully received by the downstream device. Upon successful reception of at least one of the plurality of ACK DLLPs 504b-504d, and successful reception of the PTM response message 506, the downstream device can forgo retransmission of the duplicate PTM request 508, and the replay timer can timeout.

Figure 6:
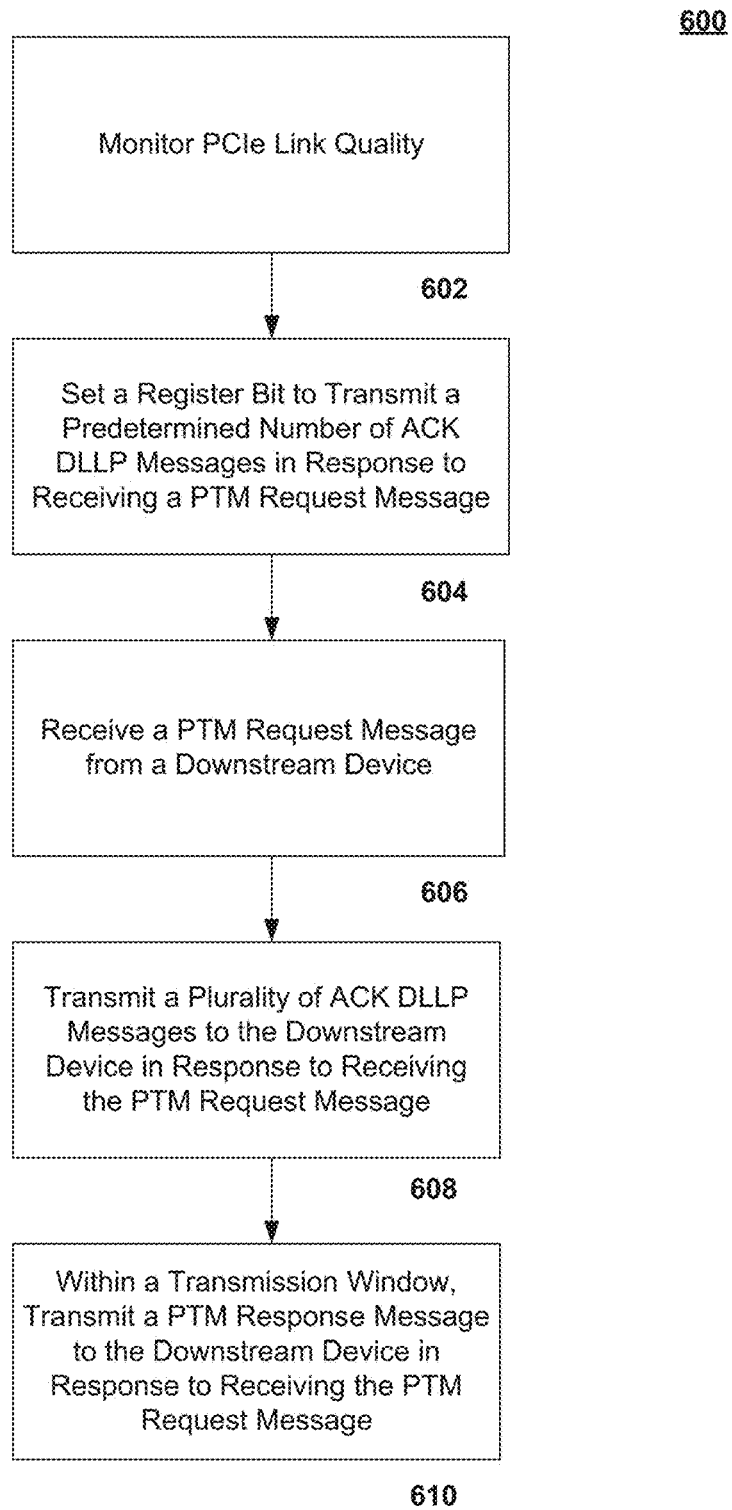
FIG. 6 is a process flow diagram for an upstream device to transmit a plurality of ACK DLLPs to a downstream device in accordance with embodiments of the present disclosure.

FIG. 6 is a process flow diagram 600 for an upstream device to transmit a plurality of ACK DLLPs to a downstream device in accordance with embodiments of the present disclosure. At the outset, a controller that is part of an uplink device, such as a root port, can monitor link quality for determining a number of ACK DLLPs to transmit across the link in response to receiving messages (e.g., PTM Request messages) from a downstream device (602). Based on the link quality, the controller can set a register bit that identifies a number of ACK DLLPs to be transmitted in response to successfully receiving a message from a downstream device (e.g., from an upstream port) (604). The upstream device can receive a PTM request message from an upstream port of a downstream device (606). Upon successfully receiving the PTM request message, the upstream device can transmit a plurality of AKC DLLP messages to the downstream port through a downstream port on the upstream device (608). The number of ACK DLLPs is based on the register bit set. The upstream device can transmit a PTM response message within a response window to the downstream device through a downstream port (610), the PTM response including a timestamp for one or both of a time that the request was received by the upstream device or a time difference between reception of a request and transmission of a response for a previous dialog between the downstream device and the upstream device.

Figure 7:
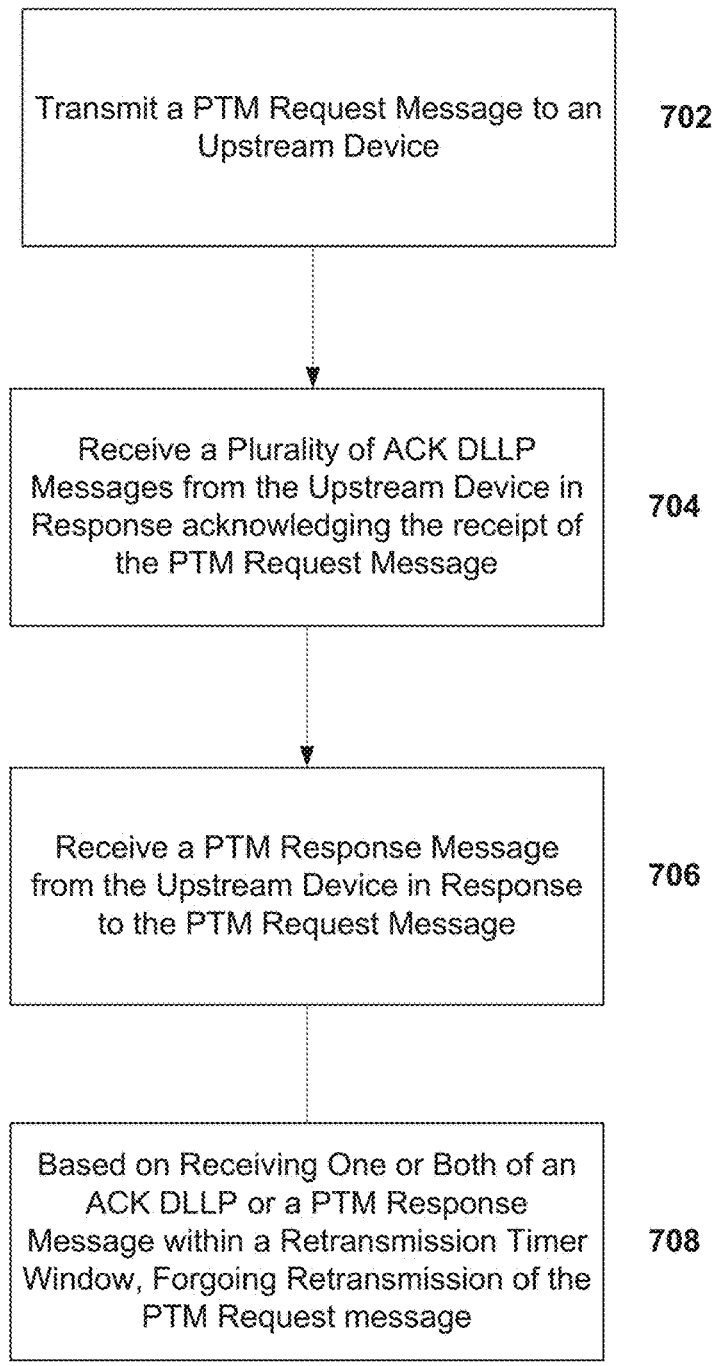
FIG. 7 is a process flow diagram for a downstream device to receive and process a plurality of ACK DLLPs from an upstream device in accordance with embodiments of the present disclosure.

FIG. 7 is a process flow diagram 700 for a downstream device to receive and process a plurality of ACK DLLPs from an upstream device in accordance with embodiments of the present disclosure. The downstream device can transmit through an upstream port a message (e.g., a PTM request message) to an upstream device (702). In response to the PTM request message, the downstream device can receive a plurality of ACK DLLP messages within a transmission window (704). Also in response to the PTM request message, the downstream device can receive a PTM response message, the PTM response including a timestamp for one or both of a time that the request was received by the upstream device or a time difference between reception of a request and transmission of a response for a previous dialog between the downstream device and the upstream device (706). Based on receiving one or both of at least one of the plurality of ACK DLLP messages or a PTM Response message within a retransmission timer window, the downstream device can forgo retransmission of the PTM request message (708).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 8:
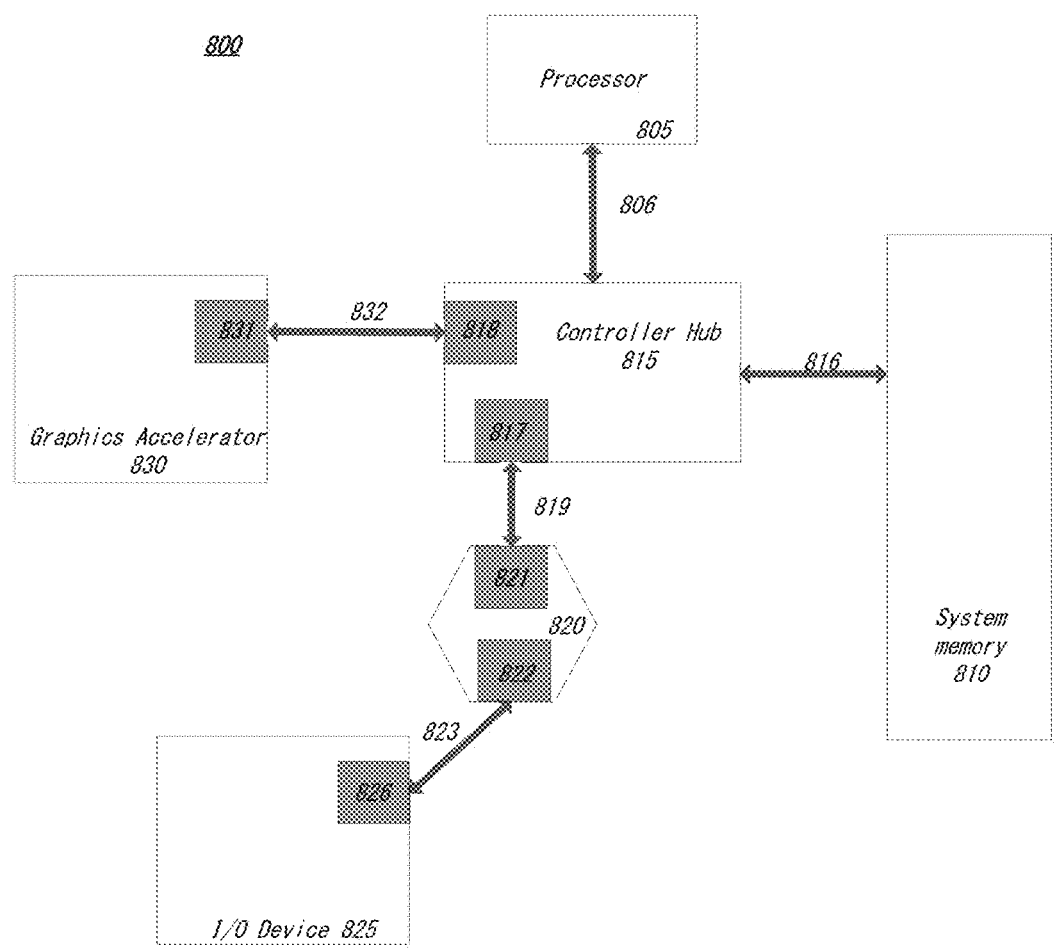
FIG. 8 illustrates an embodiment of a computing system including an interconnect architecture in accordance with embodiments of the present disclosure.

Referring to FIG. 8, an embodiment of a fabric composed of point-to-point Links that interconnect a set of components is illustrated. System 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standard.

System memory 810 includes any memory device, such as random access memory (RAM), non-volatile (NV) memory, or other memory accessible by devices in system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a Peripheral Component Interconnect Express (PCIe or PCIE) interconnection hierarchy. The controller 815 can set a register bit to define a number of duplicate ACK DLLPs to transmit upon successful reception of a PTM Request message. The register bit can be changed dynamically based on link quality and/or processing overhead. For example, for a link that is of a high quality, as characterized by a low incidence of ACK DLLP corruptions (or characterized by other quality properties), the number of duplicate ACK DLLPs can be reduced. For poor link qualities, the duplicate ACK DLLPs can be increased.

Examples of controller hub 815 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 805, while controller 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which may also be referred to as interfaces/ports 817 and 821, include/implement a layered protocol stack to provide communication between controller hub 815 and switch 820. In one embodiment, multiple devices are capable of being coupled to switch 820.

Switch/bridge 820 routes packets/messages from device 825 upstream, i.e. up a hierarchy towards a root complex, to controller hub 815 and downstream, i.e. down a hierarchy away from a root controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 825 may include a PCIe to PCI/PCI-X bridge to support legacy or other version PCI devices. Endpoint devices in PCIe are often classified as legacy, PCIe, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself may be integrated in processor 805.

Figure 9:
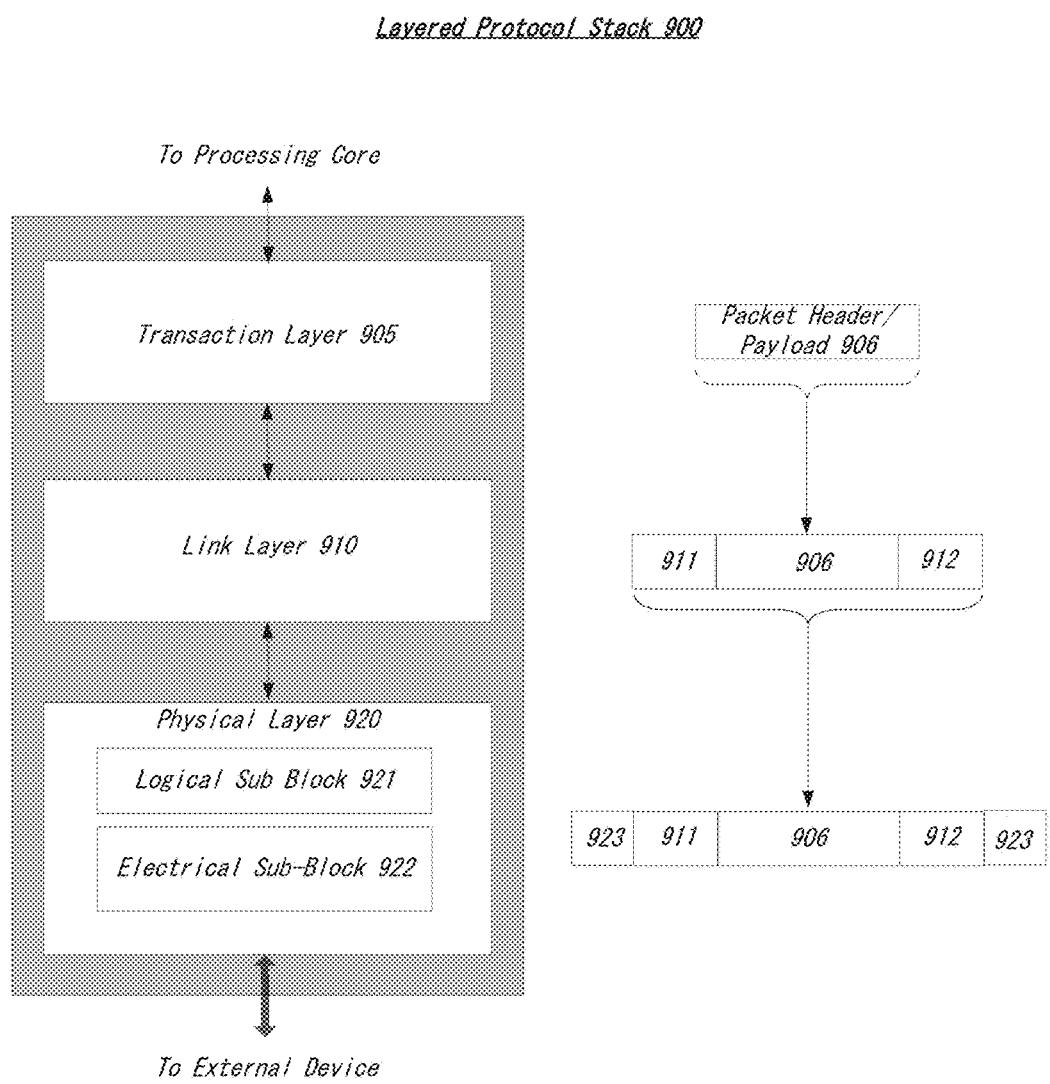
FIG. 9 illustrates an embodiment of a interconnect architecture including a layered stack in accordance with embodiments of the present disclosure.

Turning to FIG. 9 an embodiment of a layered protocol stack is illustrated. Layered protocol stack 900 includes any form of a layered communication stack, such as a Quick Path Interconnect (QPI) stack, a PCie stack, a next generation high performance computing interconnect stack, or other layered stack. Although the discussion immediately below in reference to FIGS. 8-11 are in relation to a PCIe stack, the same concepts may be applied to other interconnect stacks. In one embodiment, protocol stack 900 is a PCIe protocol stack including transaction layer 905, link layer 910, and physical layer 920. An interface, such as interfaces 817, 818, 821, 822, 826, and 831 in FIG. 8, may be represented as communication protocol stack 900. Representation as a communication protocol stack may also be referred to as a module or interface implementing/including a protocol stack.

PCI Express uses packets to communicate information between components. Packets are formed in the Transaction Layer 905 and Data Link Layer 910 to carry the information from the transmitting component to the receiving component. As the transmitted packets flow through the other layers, they are extended with additional information necessary to handle packets at those layers. At the receiving side the reverse process occurs and packets get transformed from their Physical Layer 920 representation to the Data Link Layer 910 representation and finally (for Transaction Layer Packets) to the form that can be processed by the Transaction Layer 905 of the receiving device.

Transaction Layer

In one embodiment, transaction layer 905 is to provide an interface between a device's processing core and the interconnect architecture, such as data link layer 910 and physical layer 920. In this regard, a primary responsibility of the transaction layer 905 is the assembly and disassembly of packets (i.e., transaction layer packets, or TLPs). The translation layer 905 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 905. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 905 assembles packet header/payload 906. Format for current packet headers/payloads may be found in the PCIe specification at the PCIe specification website.

Figure 10:
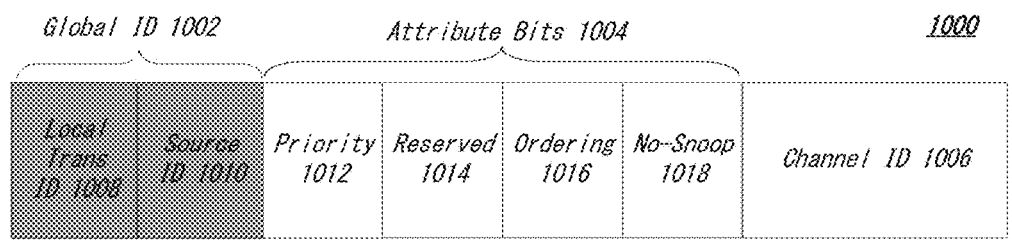
FIG. 10 illustrates an embodiment of a request or packet to be generated or received within an interconnect architecture in accordance with embodiments of the present disclosure.

Briefly referring to FIG. 10, an embodiment of a PCIe transaction descriptor is illustrated. In one embodiment, transaction descriptor 1000 is a mechanism for carrying transaction information. In this regard, transaction descriptor 1000 supports identification of transactions in a system. Other potential uses include tracking modifications of default transaction ordering and association of transaction with channels.

Transaction descriptor 1000 includes global identifier field 1002, attributes field 1004 and channel identifier field 1006. In the illustrated example, global identifier field 1002 is depicted comprising local transaction identifier field 1008 and source identifier field 1010. In one embodiment, global transaction identifier 1002 is unique for all outstanding requests.

According to one implementation, local transaction identifier field 1008 is a field generated by a requesting agent, and it is unique for all outstanding requests that require a completion for that requesting agent. Furthermore, in this example, source identifier 1010 uniquely identifies the requestor agent within a PCIe hierarchy. Accordingly, together with source ID 1010, local transaction identifier 1008 field provides global identification of a transaction within a hierarchy domain.

Attributes field 1004 specifies characteristics and relationships of the transaction. In this regard, attributes field 1004 is potentially used to provide additional information that allows modification of the default handling of transactions. In one embodiment, attributes field 1004 includes priority field 1012, reserved field 1014, ordering field 1016, and no-snoop field 1018. Here, priority sub-field 1012 may be modified by an initiator to assign a priority to the transaction. Reserved attribute field 1014 is left reserved for future, or vendor-defined usage. Possible usage models using priority or security attributes may be implemented using the reserved attribute field.

In this example, ordering attribute field 1016 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1018 is utilized to determine if transactions are snooped. As shown, channel ID Field 1006 identifies a channel that a transaction is associated with.

Link Layer

Returning to FIG. 9, link layer 910, also referred to as data link layer 910, acts as an intermediate stage between transaction layer 905 and the physical layer 920. In one embodiment, a responsibility of the data link layer 910 is providing a reliable mechanism for exchanging Transaction Layer Packets (TLPs) between two components a link. One side of the Data Link Layer 910 accepts TLPs assembled by the Transaction Layer 905, applies packet sequence identifier 911, i.e. an identification number or packet number, calculates and applies an error detection code, i.e. CRC 912, and submits the modified TLPs to the Physical Layer 920 for transmission across a physical to an external device.

Physical Layer

In one embodiment, physical layer 920 includes logical sub block 921 and electrical sub-block 922 to physically transmit a packet to an external device. Here, logical sub-block 921 is responsible for the "digital" functions of Physical Layer 921. In this regard, the logical sub-block includes a transmit section to prepare outgoing information for transmission by physical sub-block 922, and a receiver section to identify and prepare received information before passing it to the Link Layer 910.

Physical block 922 includes a transmitter and a receiver. The transmitter is supplied by logical sub-block 921 with symbols, which the transmitter serializes and transmits onto to an external device. The receiver is supplied with serialized symbols from an external device and transforms the received signals into a bit-stream. The bit-stream is de-serialized and supplied to logical sub-block 921. In one embodiment, an 8b/10b transmission code is employed, where ten-bit symbols are transmitted/received. Here, special symbols are used to frame a packet with frames 923. In addition, in one example, the receiver also provides a symbol clock recovered from the incoming serial stream.

As stated above, although transaction layer 905, link layer 910, and physical layer 920 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 11:
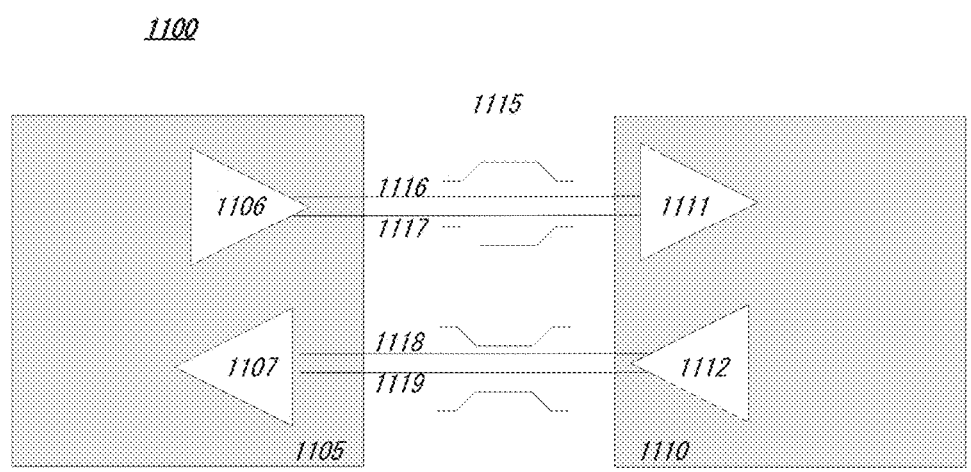
FIG. 11 illustrates an embodiment of a transmitter and receiver pair for an interconnect architecture in accordance with embodiments of the present disclosure.

Referring next to FIG. 11, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1106/1111 and a receive pair 1112/1107. Accordingly, device 1105 includes transmission logic 1106 to transmit data to device 1110 and receiving logic 1107 to receive data from device 1110. In other words, two transmitting paths, i.e. paths 1116 and 1117, and two receiving paths, i.e. paths 1118 and 1119, are included in a PCIe link.

A transmission path refers to any path for transmitting data, such as a transmission line, a copper line, an optical line, a wireless communication channel, an infrared communication link, or other communication path. A connection between two devices, such as device 1105 and device 1110, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
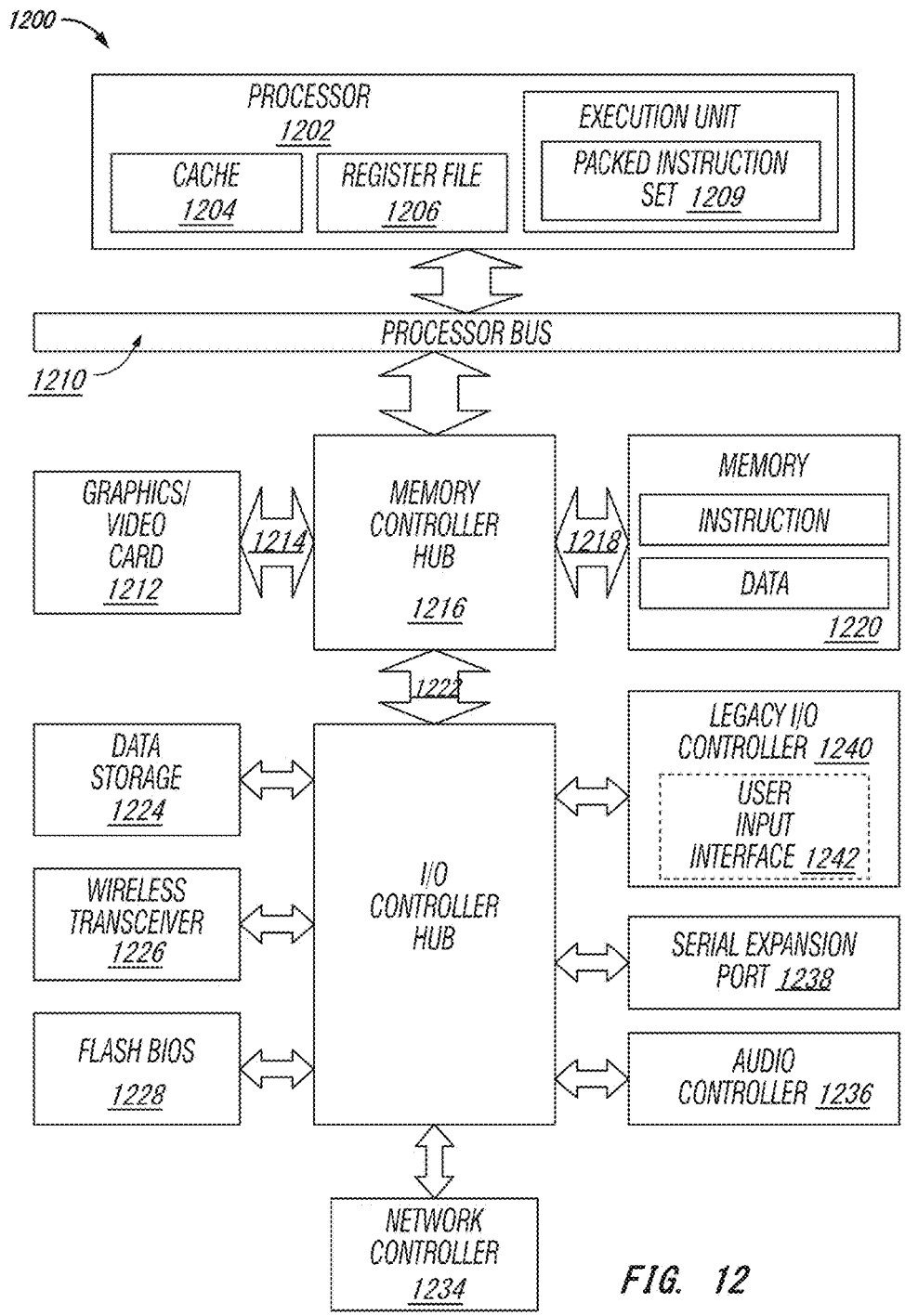
FIG. 12 illustrates another embodiment of a block diagram for a computing system including a processor in accordance with embodiments of the present disclosure.

Turning to FIG. 12, a block diagram of an exemplary computer system formed with a processor that includes execution units to execute an instruction, where one or more of the interconnects implement one or more features in accordance with one embodiment of the present invention is illustrated. System 1200 includes a component, such as a processor 1202 to employ execution units including logic to perform algorithms for process data, in accordance with the present invention, such as in the embodiment described herein. System 1200 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1202 includes one or more execution units 1208 to implement an algorithm that is to perform at least one instruction. One embodiment may be described in the context of a single processor desktop or server system, but alternative embodiments may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one embodiment, the processor 1202 includes a Level 1 (L1) internal cache memory 1204. Depending on the architecture, the processor 1202 may have a single internal cache or multiple levels of internal caches. Other embodiments include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1202. For one embodiment, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

Note that any of the aforementioned features or aspects of the invention may be utilized on one or more interconnect illustrated in FIG. 12. For example, an on-die interconnect (ODI), which is not shown, for coupling internal units of processor 1202 implements one or more aspects of the invention described above. Or the invention is associated with a processor bus 1210 (e.g. Intel Quick Path Interconnect (QPI) or other known high performance computing interconnect), a high bandwidth memory path 1218 to memory 1220, a point-to-point link to graphics accelerator 1212 (e.g. a Peripheral Component Interconnect express (PCIe) compliant fabric), a controller hub interconnect 1222, an I/O or other interconnect (e.g. USB, PCI, PCIe) for coupling the other illustrated components. Some examples of such components include the audio controller 1236, firmware hub (flash BIOS) 1228, wireless transceiver 1226, data storage 1224, legacy I/O controller 1210 containing user input and keyboard interfaces 1242, a serial expansion port 1238 such as Universal Serial Bus (USB), and a network controller 1234. The data storage device 1224 can comprise a hard disk drive, a floppy disk drive, a CD-ROM device, a flash memory device, or other mass storage device.

Figure 13:
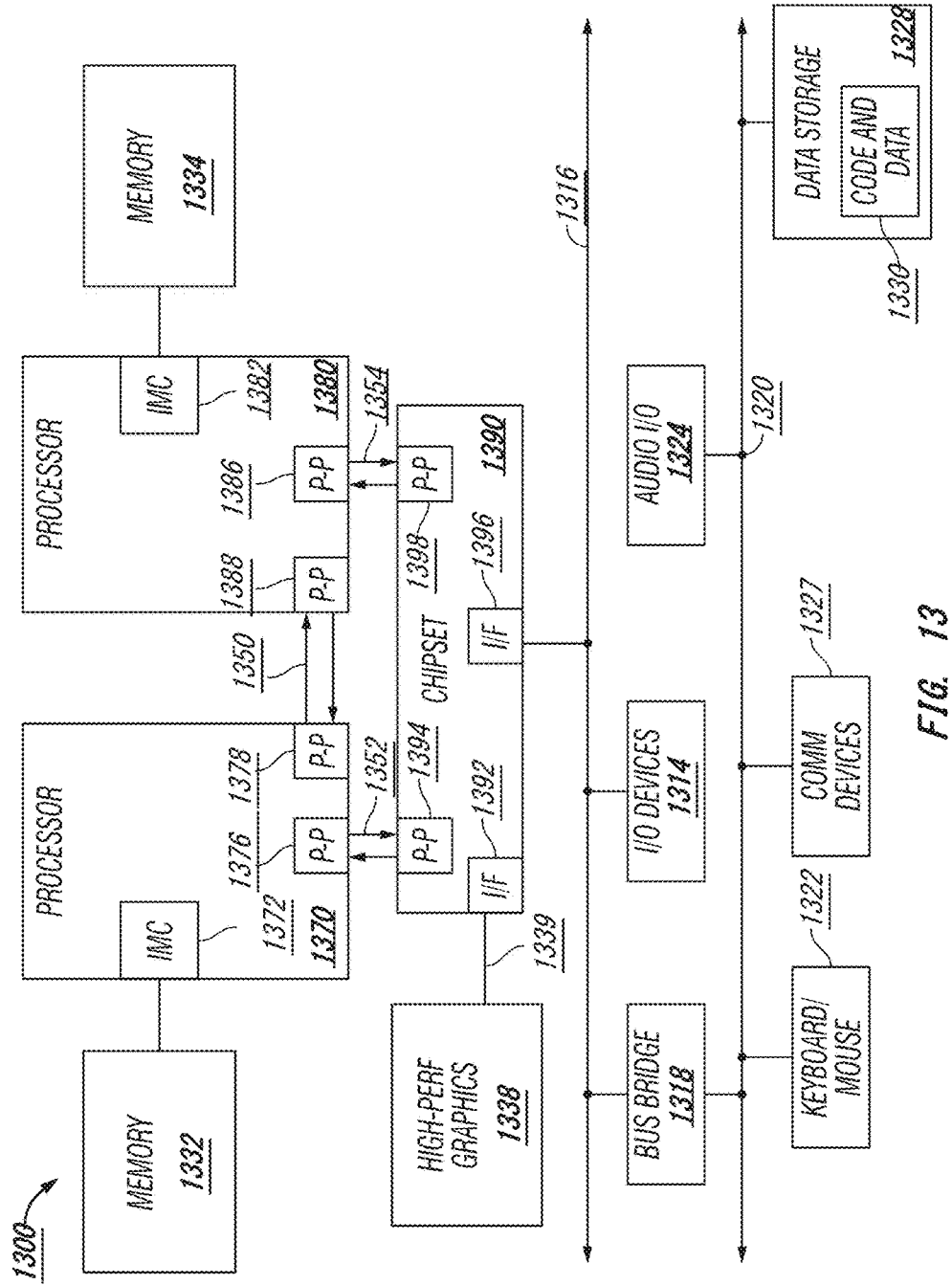
FIG. 13 illustrates an embodiment of a block for a computing system including multiple processor sockets in accordance with embodiments of the present disclosure.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and methods.

Example 1 is an upstream device including an input/output port. The input/output port can be configured to receive a message from an output port of a downstream device; transmit a plurality of acknowledgement messages to the downstream device; and transmit a response message to the received message to the downstream device.

Example 2 may include the subject matter of example 1, wherein the received message includes a precision time measurement (PTM) request message.

Example 3 may include the subject matter of example 2, wherein the response message to the PTM request message includes a PTM response message.

Example 4 may include the subject matter of example 3, wherein the PTM response message includes a PTM responseD message.

Example 5 may include the subject matter of any of examples 1-4, wherein the message received and the response message are part of a precision time measurement (PTM) dialog.

Example 6 may include the subject matter of any of examples 1-5, wherein the plurality of acknowledgement (ACK) messages include two or more ACK data link layer packets (DLLPs).

Example 7 may include the subject matter of any of examples 1-6, and can also include controller logic to monitor a link quality of a link between the upstream device and the downstream device; set a register bit to identify a number of acknowledgement messages based on the link quality of the link between the upstream device and the downstream device; and transmit the number of acknowledgement messages to the downstream device based on successful reception of a message from the downstream device.

Example 8 may include the subject matter of any of examples 1-7, wherein the response message includes a timestamp for one or both of a time that the request was received by the upstream device or a time difference between reception of a request and transmission of a response for a previous dialog between the downstream device and the upstream device.

Example 9 is a method including receiving a message from an output port of a downstream device; transmitting a plurality of acknowledgement messages to the downstream device; and transmitting a response message to the received message to the downstream device.

Example 10 may include the subject matter of example 9, wherein the received message includes a precision time measurement (PTM) request message.

Example 11 may include the subject matter of example 10, wherein the response message to the PTM request message includes a PTM response message.

Example 12 may include the subject matter of example 11, wherein the PTM response message includes a PTM responseD message.

Example 13 may include the subject matter of any of examples 9-12, wherein the message received and the response message are messages of a precision time measurement (PTM) dialog.

Example 14 may include the subject matter of any of examples 9-13, wherein the plurality of acknowledgement (ACK) messages include two or more ACK data link layer packets (DLLPs).

Example 15 may include the subject matter of any of examples 9-14, wherein the response message includes a timestamp for one or both of a time that the request was received by the upstream device or a time difference between reception of a request and transmission of a response for a previous dialog between the downstream device and the upstream device.

Example 16 may include the subject matter of any of examples 9-15, further including monitoring a link quality of a link between the upstream device and the downstream device; setting a register bit to identify a number of acknowledgement messages based on the link quality of the link between the upstream device and the downstream device; and transmitting the number of acknowledgement messages to the downstream device based on successful reception of a message from the downstream device.

Example 17 is at least one machine accessible storage medium having code stored thereon, the code when executed on a machine, causes the machine to receive a message from an output port of a downstream device; transmit a plurality of acknowledgement messages to the downstream device; and transmit a response message to the received message to the downstream device.

Example 18 may include the subject matter of example 17, wherein the received message includes a precision time measurement (PTM) request message.

Example 19 may include the subject matter of example 18, wherein the response message to the PTM request message includes a PTM response message.

Example 20 may include the subject matter of example 19, wherein the PTM response message includes a PTM responseD message.

Example 21 may include the subject matter of any of examples 17-20, wherein the message received and the response message are part of a precision time measurement (PTM) dialog.

Example 22 may include the subject matter of any of examples 17-21, wherein the plurality of acknowledgement (ACK) messages include two or more ACK data link layer packets (DLLPs).

Example 23 may include the subject matter of any of examples 17-22, the code when executed on a machine, causes the machine to monitor a link quality of a link between the upstream device and the downstream device; set a register bit to identify a number of acknowledgement messages based on the link quality of the link between the upstream device and the downstream device; and transmit the number of acknowledgement messages to the downstream device based on successful reception of a message from the downstream device.

Example 24 may include the subject matter of any of examples 17-23, wherein the response message includes a timestamp for one or both of a time that the request was received by the upstream device or a time difference between reception of a request and transmission of a response for a previous dialog between the downstream device and the upstream device.

Example 25 is a system including a data link including a plurality of lanes; a first device; and a second device communicatively coupled to the first device using the data link. The second device including I/O logic configured to receive a message from an output port of a downstream device; transmit a plurality of acknowledgement messages to the downstream device; and transmit a response message to the received message to the downstream device.

Example 26 may include the subject matter of example 25, wherein the received message includes a precision time measurement (PTM) request message.

Example 27 may include the subject matter of example 26, wherein the response message to the PTM request message includes a PTM response message.

Example 28 may include the subject matter of any of examples 25-27, wherein the plurality of acknowledgement (ACK) messages include two or more ACK data link layer packets (DLLPs).

Example 29 may include the subject matter of any of examples 25-28, the second device including I/O logic to monitor a link quality of a link between the upstream device and the downstream device; set a register bit to identify a number of acknowledgement messages based on the link quality of the link between the upstream device and the downstream device; and transmit the number of acknowledgement messages to the downstream device based on successful reception of a message from the downstream device.

Example 30 may include the subject matter of any of examples 25-29, wherein the response message includes a timestamp for one or both of a time that the request was received by the upstream device or a time difference between reception of a request and transmission of a response for a previous dialog between the downstream device and the upstream device.

Example 31 may include the subject matter of any of examples 1-30, wherein transmitting the PTM response message comprises transmitting the PTM response message to the downstream device within a predetermined time period, the predetermined time period defining a retransmission window for the downstream device to retransmit the PTM request message.

Example 32 may include the subject matter of example 31, wherein transmitting the plurality of acknowledgement messages to the downstream device comprises transmitting the plurality of acknowledgement messages to the downstream device within the predetermined time period and during a time period preceding the transmittal of the PTM response message.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An upstream device comprising:
an input/output port to:
    receive a precision time measurement (PTM) request message from an output port of a downstream device;
    transmit a plurality of acknowledgement messages to the downstream device based on receiving the PIM request message; and
    transmit a PIM response message to the received message to the downstream device; and
controller logic to:
    monitor a link quality of a link between the upstream device and the downstream device;
    set a register bit to identify a number of acknowledgement messages based on the link quality of the link between the upstream device and the downstream device; and
    transmit the number of acknowledgement messages to the downstream device based on successful reception of a message from the downstream device.

2. The apparatus of claim 1, wherein the PTM response message comprises a PTM response message with data.

3. The apparatus of claim 1, wherein the PTM request message received and the PTM response message are part of a precision time measurement (PTM) dialog.

4. The apparatus of claim 1, wherein the plurality of acknowledgement (ACK) messages comprise two or more ACK data link layer packets (DLLPs).

5. The apparatus of claim 1, wherein the PTM response message comprises a timestamp for one or both of a time that the request was received by the upstream device or a time difference between reception of a request and transmission of a response for a previous dialog between the downstream device and the upstream device.

6. The upstream device of claim 1, wherein the number of acknowledgement messages comprises the plurality of acknowledgement message to the downstream device, and wherein the successful reception of the message comprises a successful reception of the PTM request message received from the downstream device.

7. A method comprising:
  receiving a precision time measurement (PTM) request message from an output port of a downstream device;
  transmitting a plurality of acknowledgement messages to the downstream device based on receiving the PTM request message;
  transmitting a PTM response message to the PTM request message to the downstream device;
  monitoring a link quality of a link between the upstream device and the downstream device;
  setting a register bit to identify a number of acknowledgement messages based on the link quality of the link between the upstream device and the downstream device; and
  transmitting the number of acknowledgement messages to the downstream device based on successful reception of the PTM request message from the downstream device.

8. The method of claim 7, wherein the PTM response message comprises a timestamp for one or both of a time that the request was received by the upstream device or a time difference between reception of a request and transmission of a response for a previous dialog between the downstream device and the upstream device.

9. The method of claim 7, wherein transmitting the PTM response message comprises transmitting the PTM response message to the downstream device within a predetermined time period, the predetermined time period defining a retransmission window for the downstream device to retransmit the PTM request message.

10. The method of claim 9, wherein transmitting the plurality of acknowledgement messages to the downstream device comprises transmitting the plurality of acknowledgement messages to the downstream device within the predetermined time period and during a time period preceding the transmittal of the PTM response message.

11. The method of claim 7, wherein transmitting the number of acknowledgement messages to the downstream device comprises transmitting a plurality of acknowledgement messages to the downstream device.

12. At least one machine accessible storage medium having code stored thereon, the code when executed on a machine, causes the machine to:
  receive a message from an output port of a downstream device;
  transmit a plurality of acknowledgement messages to the downstream device;
  transmit a response message to the received message to the downstream device;
  monitor a link quality of a link between the upstream device and the downstream device;
  set a register bit to identify a number of acknowledgement messages based on the link quality of the link between the upstream device and the downstream device; and
  transmit the number of acknowledgement messages to the downstream device based on successful reception of a message from the downstream device.

13. The at least one machine accessible storage medium of claim 12, wherein the received message comprises a precision time measurement (PTM) request message.

14. The at least one machine accessible storage medium of claim 13, wherein the response message to the PTM request message comprises a PTM response message.

15. The at least one machine accessible storage medium of claim 14, wherein the PTM response message comprises a PTM response message with data.

16. The at least one machine accessible storage medium of claim 12, wherein the message received and the response message are part of a precision time measurement (PTM) dialog.

17. The at least one machine accessible storage medium of claim 12, wherein the plurality of acknowledgement (ACK) messages comprise two or more ACK data link layer packets (DLLPs).

18. The at least one machine accessible storage medium of claim 12, wherein the response message comprises a timestamp for one or both of a time that the request was received by the upstream device or a time difference between reception of a request and transmission of a response for a previous dialog between the downstream device and the upstream device.

19. The at least one machine accessible storage medium of claim 12, wherein transmitting the PTM response message comprises transmitting the PTM response message to the downstream device within a predetermined time period, the predetermined time period defining a retransmission window for the downstream device to retransmit the PTM request message; and
  wherein transmitting the plurality of acknowledgement messages to the downstream device comprises transmitting the plurality of acknowledgement messages to the downstream device within the predetermined time period and during a time period preceding the transmittal of the PIM response message.

20. The at least one machine accessible storage medium of claim 12, wherein transmitting the number of acknowledgement messages to the downstream device based on successful reception of a message from the downstream device comprises transmitting the plurality of acknowledgement messages to the downstream device based on successful reception of the PTM message from the downstream device.

* * * * *